United States Patent [19]

Tarridec et al.

[11] Patent Number: 4,751,699

[45] Date of Patent: Jun. 14, 1988

[54] MULTIPLEXING AND DEMULTIPLEXING EQUIPMENTS FOR A SYNCHRONOUS DIGITAL LINK WITH VARIABLE MODULATION SPEED AND RATE

[76] Inventors: André Tarridec, Lanrududu; Pierre Coatanea, Ker Noel - St Quay Perros, both of 22700 Perros Guirec, France

[21] Appl. No.: 907,146

[22] Filed: Sep. 12, 1986

[30] Foreign Application Priority Data

Sep. 12, 1985 [FR] France ............................... 85 13553

[51] Int. Cl.[4] ........................... H04L 5/22; H04J 3/22
[52] U.S. Cl. ..................................................... 370/84
[58] Field of Search .................. 370/84, 112, 91, 109, 370/119

[56] References Cited

U.S. PATENT DOCUMENTS

| | | | |
|---|---|---|---|
| 3,692,942 | 9/1972 | Inose et al. ........................... | 370/91 |
| 3,987,251 | 10/1976 | Texier et al. ......................... | 370/84 |
| 4,205,200 | 5/1980 | Parikh et al. ......................... | 370/91 |
| 4,367,549 | 1/1983 | Vachee ................................ | 370/91 |

FOREIGN PATENT DOCUMENTS

2825954 3/1979 Fed. Rep. of Germany ...... 370/109

Primary Examiner—Douglas W. Olms
Assistant Examiner—Melvin Marcelo
Attorney, Agent, or Firm—Lowe, Price, LeBlanc Becker & Shur

[57] ABSTRACT

Multiplexing and demultiplexing equipments are provided for in end stations of a bidirectional synchronous digital link in which one of the multiplexed signals offers a variable rate at the request of either of the stations. The resultant signal transmitted on the link has a variable modulation speed as a function of the rate requested. More particularly, in an integrated services digital network, a multiplexing equipment and a demultiplexing equipment are intended to provide a non-specific interface for a subscriber monitoring system or terminal connected to the system so that each interface can dynamically define the rates used in both directions of transmission. This allows connections of any terminal, whatever the rates it requires in both directions of transmission, to any of terminal ports of the system, which are also non-specific.

17 Claims, 8 Drawing Sheets

FIG. 6
PROGRAMMABLE TIME BASE 14

FIG. 7
PROGRAMMABLE CLOCK RECOVERING CIRCUIT 17

MULTIPLEXING AND DEMULTIPLEXING EQUIPMENTS FOR A SYNCHRONOUS DIGITAL LINK WITH VARIABLE MODULATION SPEED AND RATE

BACKGROUND OF THE INVENTION

1. Field of the Invention

This invention relates to multiplexing and demultiplexing equipments in end stations of a bidirectional synchronous digital link in which one of multiplexed signals offers a variable rate at the request of one of the stations and where a resulting signal transmitted on the link has a modulation speed which varies according to the rate requested.

More generally, the invention uses time division multiplexing and demultiplexing techniques (TDM) for digital signals having constant rhythm frequencies or rates which differ from each other in a variable ratio, as well as time base and programmable clock recovery techniques and message signalling between stations such as central monitoring systems and terminals.

2. Description of the Prior Art

The developments in digital local networks have led to the connection of a large number of terminals of different types to an integrated services digital network (ISDN) through a subscriber central monitoring system. In particular, the terminals request totally different rates in the two transmission directions as a function of the tasks to be carried out.

At present, the subscriber monitoring system allocates a specific digital link to each of terminals, the link having a constant rate set once and for all according to the rate used by the terminal. During tasks performed by the terminal, when it is required to transmit or receive a quantity of data which is small in comparison to the total capacity offered by the link, the energy consumption is high in comparison to that strictly necessary for the data transmission. In addition, when a terminal is to be replaced by a more advanced terminal operating with a different rate, or by a terminal of another type, following a new geographical layout of the subscriber terminals, the link interfaces between the central monitoring system and the terminals must be changed to make them compatible with the rates of the new terminals.

OBJECTS OF THE INVENTION

The main object of this invention is to obviate the above-mentioned problems by providing non-specific interfaces between a subscriber central monitoring system and terminals.

Another object of this invention is to allow the connection of any terminal, whatever the rates it needs in both directions of transmission, to any of system terminal ports, which are themselves non-specific.

A further object of this invention is the design of a multiplexing equipment and a demultiplexing equipment to be included in a non-specific port of the system or a terminal, so that each terminal can dynamically define the rates used in both transmission directions, and so that in each transmission direction, the resulting signal transmitted on the link has a modulation speed adapted to the rate used.

The dynamic choice of the rates means that energy consumption can be reduced, by using a low rate in particular during signalling exchanges prior to all high rate data exchanges.

Furthermore, the non-specific nature of the ports means that the interfaces can be standardised both in the monitoring system and in the terminals, thus reducing costs accordingly.

A still further object of this invention is to offer a high degree of compatibility with the subscriber-network interface, typically at the basic rate of 192 kbit/s as defined by the International Telegraph and Telephone Consultative Committee (CCITT) in its recommendations I430, I440/Q920 and I451/Q930. In the terminal to system direction, this subscriber-network interface offers three constant rate channels, B1 at 64 kbit/s, B2 at 64 kbit/s and D at 16 kbit/s, plus auxiliary channels having a total cummulative rate of 48 kbit/s, and in the system to terminal direction, three channels B1, B2 and D at the above-mentioned constant rates, plus an echo channel E at 16 kbit/s and auxiliary channels having a total cumulative rate of 32 kbit/s. This interface also offers a signalling protocol on channel D for message dialog between the terminal and the central monitoring system.

The interface according to the invention has the same channel structure as the interface defined by the CCITT, but channel B2 has variable rate of $N \times 64$ kbit/s, where N is a number lying between 1 and 1250, or even more. The interface takes the form of a multiplex including constant rate channels having a cumulative total rate of $64 + 16 + 48 = 128$ kbit/s and a variable rate channel having a rate of $N \times 64$ kbit/s.

SUMMARY OF THE INVENTION

According to the above objects, a multiplexing equipment multiplexes a first digital signal having a first constant rhythm frequency with a digital signal having a second variable rhythm frequency into a resultant digital signal having a variable rhythm frequency, or bit rate, equal to the sum of the first and second rhythm frequencies. The resulting signal is structured in recurrent frames having a predetermined period.

The first digital signal carries data indicating a change in the rhythm frequency of the second digital signal. The frame of the resultant signal comprises a constant number of bits of the first digital signal equal to the constant product of the first rhythm frequency by the frame period, whatever the second variable rhythm frequency, and a variable number of bits of the second digital signal equal to the product of the second variable rhythm frequency by the frame period.

The multiplexing equipment comprises first means for memorizing consecutive bits of the first signal received during each frame period, first means for writing received bits of the first signal in the first memorizing means at the rhythm of the first frequency, means for reading the written bits of the first signal at the rhythm frequency of the resultant signal, second means of memorizing the bits of the second signal received during no more than one frame period, second means for writing the received bits of the second signal in the second memorizing means at the rhythm of the second frequency, means for reading the written bits of the second signal at the rhythm frequency of the resultant signal, and means for transmitting and transcoding the resultant signal into a line signal, and means for detecting the rhythm frequency change data, and means programmable as a function of the detected rhythm frequency change data for deriving at least a clock signal at the variable rhythm frequency of the resultant signal to be applied to said reading means, and a clock signal corresponding to a variable modulation speed of the line signal to be applied to the transmitting and transcoding means.

Reciprocally, according to another aspect of the invention, a demultiplexing equipment demultiplexes the resultant digital signal having a variable rhythm frequency and structured in recurrent frames having a predetermined period, into the first digital signal having a first constant rhythm frequency and a second digital signal having a second variable rhythm frequency. The demultiplexing equipment comprises means for receiving and transcoding a line signal into the resulant signal, means for memorizing received first signal bits included in the resultant signal for the frame period, means for writing the received first signal bits in the memorizing means at the frequency rhythm of the resulting signal, means for reading the written bits of the first signal at the first frequency, means for extracting the received second signal included in the resultant signal and retransmitting them at the second rhythm frequency, means for detecting the rhythm frequency change data, means programmable as a function of the detected rhythm frequency change data for deriving at least a clock signal at the variable rhythm frequency of the resultant signal to be applied to the writing means and to the extracting means, and a clock signal corresponding to a variable modulation rate of the line signal to be applied to the receiving and transcoding means.

In a bidirectional synchronous digital link with variable modulation speed and rate embodying to the invention, intended to create a non-specific interface between a first station, such as a subscriber monitoring system port, and a second station, such as a terminal, each of the stations comprises a multiplexing equipment and a demultiplexing equipment according to the invention.

In this particular embodiment, the link can have three states. In an inactive state, no signal is transmitted on the link and the two stations are on standby. One of the stations can then transmit an activation command message, manifested by the presence of a digital signal on the link, which "wakes up" the other station. The two stations then pass to a basic state allowing exchange of messages at a predetermined basic rate, defining a minimum rate for the second digital signals having variable rate. Via the intermediary of the constant rate first digital signals, either of the stations can request a rate change in either or both of the directions of transmission on the link, by transmitting a rate change request accompanied by the new rate value to the other station. After acknowledging receipt of the rate change request using a pre-established message exchange protocol, the master station changes the rate, and the other station synchronises itself with the master station.

The two stations may then proceed directly with new rate changes, without returnign to the basis state, or indirectly by returning to the basic state, for example when the data flow to be transmitted is intermittent.

In all these states, the stations can return to the inactive state by exchanging deactivation command messages.

Further it should also be noted that the multiplexing and demultiplexing operations are based on a frame structure in which the distribution of the bits in the first signal having a constant rhythm frequency and the distribution of the bits of the second signal having a variable rhythm frequency remain unchanged, only the durations of bit fields allocated to these signals in the frame varying as a function of the rate of the second signal.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

Figure 1:
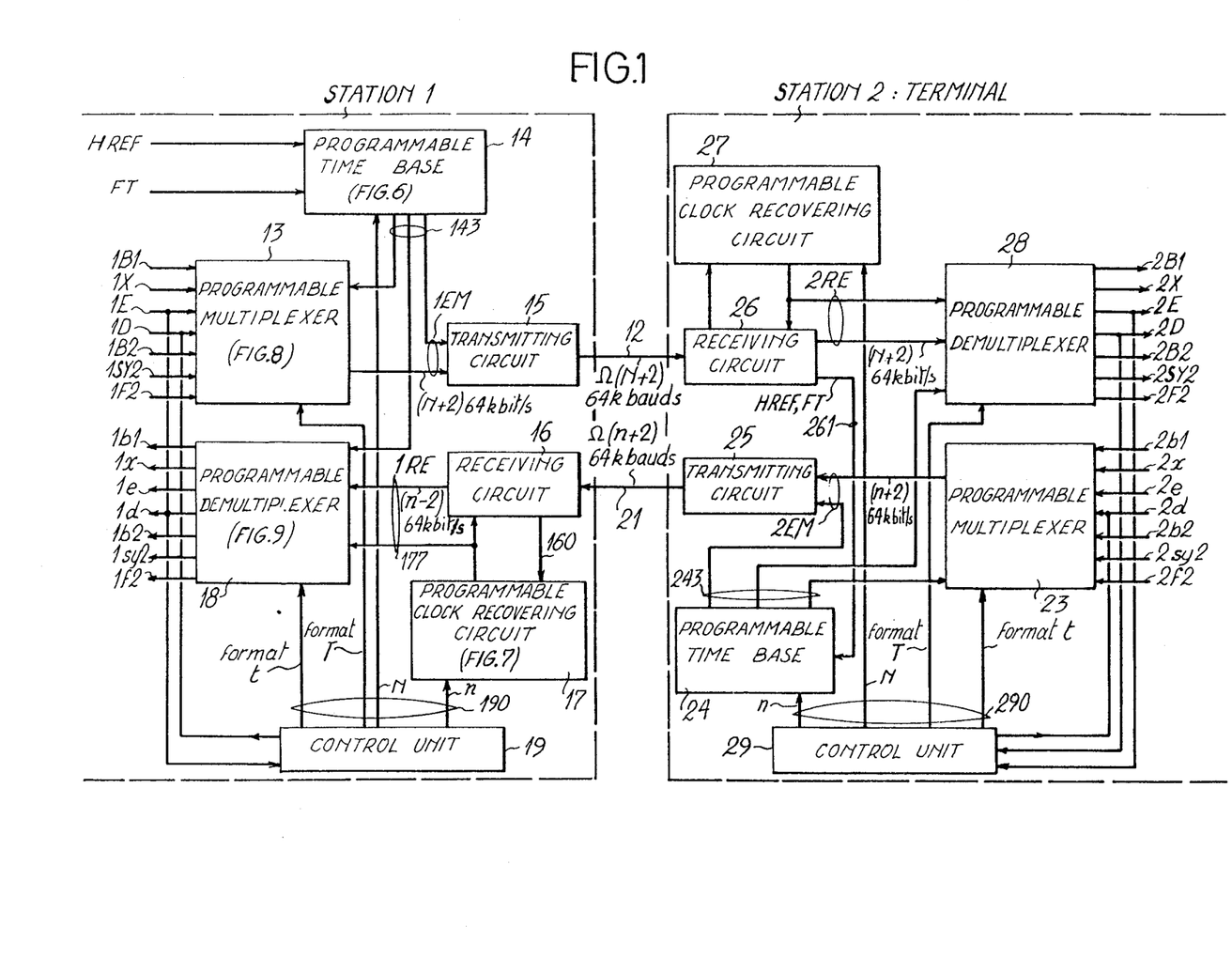
FIG. 1 is a schematic block diagram of a bidirectional synchronous digital link with variable modulation speed and rate between multiplexing and demultiplexing equipments in two end stations according to the invention.

FIG. 1 shows a bidirectional synchronous digital link with variable modulation speed and rate between two end stations 1 and 2. The link comprises two transmission mediums 12 and 21, such as optical fibres or wideband coaxial cables, allocated to the transmission of first multiplexed digital channels from station 1 to station 2 and transmission of second multiplexed digital channels from station 2 to station 1 respectively.

It is assumed that station 1 is a multi-service subscriber central monitoring system connected on the one hand to a general switched digital network of the integrated services type (ISDN) via a digital subscriber line, and on the other, to several stations 2 constituting terminals with digital interfaces included in a subscriber installation or a business local network, via links, identical to link 1-2, forming a star network. Each terminal can comprise a television set, a video recorder, a Hi-Fi receiver, a tape recorder, a digital telephone set, a videotex terminal, a fascimile transceiver with various modulation rates, a picturephone, an audiovideotex terminal, a telewriting terminal or teletex terminal such as word processor for example. By their very nature, all these terminals have differing data transmission and reception rates. However, according to the invention, each link 1-2 is always non-specific, inasmuch as it constitues a digital interface for connecting any of the above terminals to station 1, whatever the data rates to be transmitted and received. This type of link non-specificity is achieved by means of two similar sets of multiplexing and demultiplexing equipment included in stations 1 and 2 respectively and linked by link 1-2. The two sets of equipments are schematically illustrated in FIG. 1. However, other circuits included in station 1 and designed to process the digital channels allocated to links 1-2 respectively in both transmission directions for connecting each terminal to the switched network or to another terminal, and other circuits included in each terminal, such as station 2, performing functions inherent in the terminal, do not fall within the scope of the invention and are not described hereinafter.

The non-specificity of link 1-2 is based on time division multiplexings of the digital channels in both transmission directions. The multiplexings offer stable frame structures T and t having certain "elastic" time intervals for a frame period typically equal to 250 $\mu$s.

Figure 2:
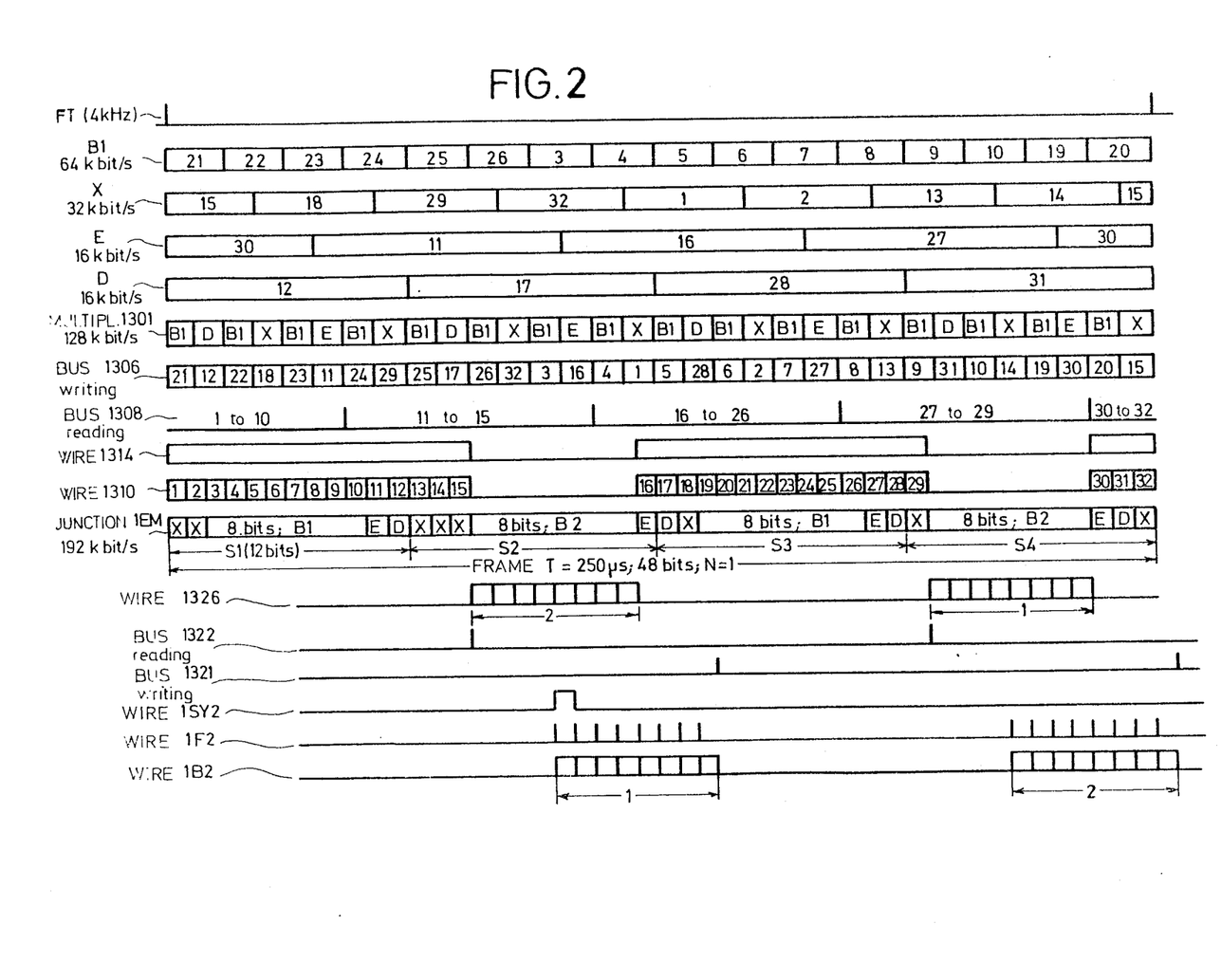
FIGS. 2 and 3 show time charts for deriving two frames in opposite transmission directions in the link respectively, as well as signals and addresses for obtaining these frames when the link is at a minimum basic rate.
Figure 4:
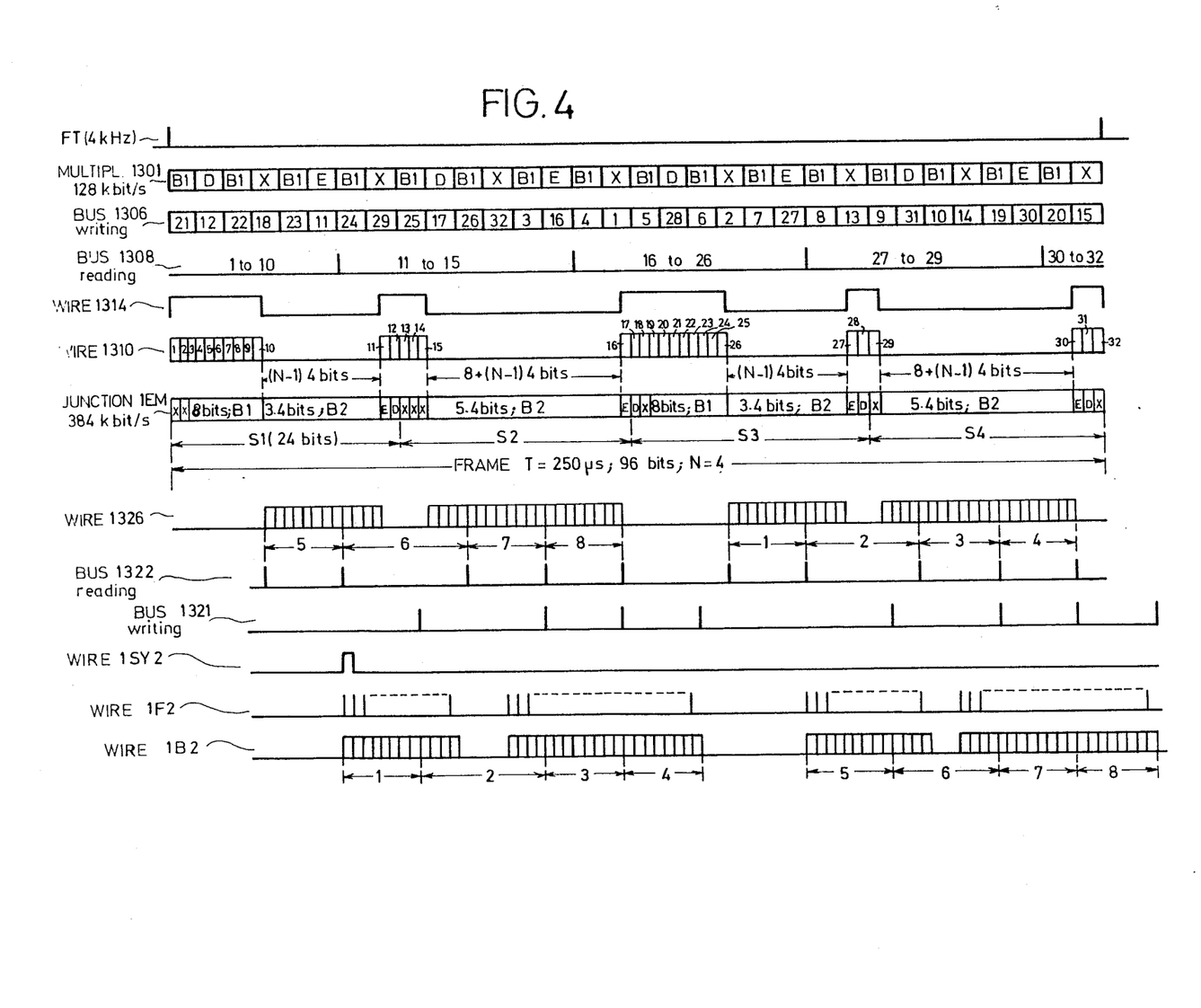
FIGS. 4 and 5 show time charts for deriving two frames in opposite directions of transmission in the link respectively, as well as signals and addresses for obtaining these frames when the link is at a rate higher than the basic rate, typically equal to double it.

A first frame T transmitted from station 1 to station 2, via medium 12 is the result of the multiplexing of 5 channels B1, B2, D, X and E, as shown in FIG. 2 or 4. A second frame t is transmitted from station 2 to station 1 via medium 21 and is the result of the multiplexing of five channels b1, b2, d, x and e.

The first channels B1 and b1 have constant rates, typically equal to 64 kbit/s.

The second channels B2 and b2 are said to have variable rates, since the rate of each of these channels can be modified at the request of either of stations 1 and 2. Typically, the rates of channels B2 and b2 vary between a basic rate of 64 kbit/s and maximum rates of (N.64) kbit/s and (n.64) kbit/s respectively, where N and n are integers between 1 and about 1250, so that station 1 can be used to serve both 64 kbit/s low-rate terminals, such as telex, fascimile and videotex terminals, as well as for example 2 Mbit/s or 70 Mbit/s high-rate terminals, such as Hi-Fi receivers, television sets, video recorders and picturephones. Furthermore, at any given time, channels B2 and b2 in link 1-2 can have different rates. For example, a Hi-Fi transmitter receives signals from a Hi-Fi receiver on channel D, and the link from the central monitoring system to the transmitter is at the basic rate of 192 kbit/s, corresponding to a channel B2 rate of 64 kbit/s. This transmitter transmits digitalized high-fidelity sounds on channel b2 and the transmitter-to-system link is at the rate of 2048 kbit/s, corresponding to a channel b2 rate of 1910 kbit/s. In another example, a video receiver, such as video recorder, transmits signals on channel d, and the receiver-to-system link is at the basic rate of 192 kbit/s, corresponding to a channel b2 rate of 64 kbit/s. This receiver receives digital video signals on channel B2, and the system-to-receiver link is at the rate of 70.144 Mbit/s, corresponding to a channel B2 rate of 70.016 Mbit/s. However, a terminal, such as a picturephone, uses both channels B2 and b2 at the same high rate of about 70 Mbit/s.

The third channels D and d have constant rates, typically equal to 16 kbit/s, and carry packet mode signalling exchanged between stations 1 and 2 as per protocol D of the S interface as defined by the CCITT. In addition, the D and d channels carry messages used to modify the rate of either of channels B2 and b2 during transmission in either of stations 1 or 2 at the request of this station or the other.

The fourth channels X and x are channels with constant rates, typically equal to 32 kbit/s, and carry operating bits, maintenance bits and balancing bits in order to eliminate DC components in the signals resulting from the multiplexing carried along mediums 12 and 21.

The fifth channels E and e are called "echo" channels and have constant rates typically equal to 16 kbit/s. Channel E can be used to as "echo" of channel D in compliance with the S interface protocol from the CCITT if the channels D of several interfaces are concentrated on a common channel D inside the central monitoring system. Channel e has no particular use.

Depending on the rate values of the above channels, the rate of the signal resulting from multiplexing in station 1 and carried by intermediate junctions 1EM and 2RE inside stations 1 and 2 respectively is equal to $64+(N.64)+16+32+16=(N+2).64$ kbit/s, and the modulation speed of the signal carried by the first transmission medium 12 is $\Omega(N+2)64$ kbauds where $\Omega$ is a number depending on the transmission code chosen in link 1-2. The rate of the signal resulting from multiplexing in station 2 and carried by intermediate junctions 2EM and 1RE inside stations 2 and 1 respectively, is equal to $64+(n.64)+16+48=(n+2).64$ kbit/s, and the modulation speed of the signal carried by the second transmission medium 21 is $\Omega(n+2)64$ kbauds.

A first frame T created in station 1 is shown in an eleventh line of FIG. 2 and a seventh line of FIG. 4 according two examples respectively. Frame T contains first fields occupied by bits of the constant rate channels, here a constant number equal to five, the first fields containing bits also with a constant number equal to 10, 5, 11, 3 and 3 respectively. Frame T is divided into four consecutive sectors $S_1$, $S_2$, $S_3$ and $S_4$ having a duration of $250/4=62.5$ $\mu$s. Each of sectors $S_1$ to $S_4$ contains at least 12 bits, eight of which are always a byte or octet of channel B1 or channel B2. Thus, the first sector $S_1$ always contains one byte of channel B1 following first two bits of channel X, and ends with one bit of channel E followed by one bit of channel D. The second sector $S_2$ always contains at least one byte of channel B2 following 3 bits of channel X and ends with one bit of channel E. The third sector $S_3$ always contains one byte of channel B1 following one bit of channel D followed by one bit of channel X and ends with one bit of channel E followed by a bit of channel D. The fourth sector $S_4$ always contains at least one byte of channel B2 following one bit of channel X and ends with one bit of channel E, one bit of channel D and one bit of channel X.

Figure 3:
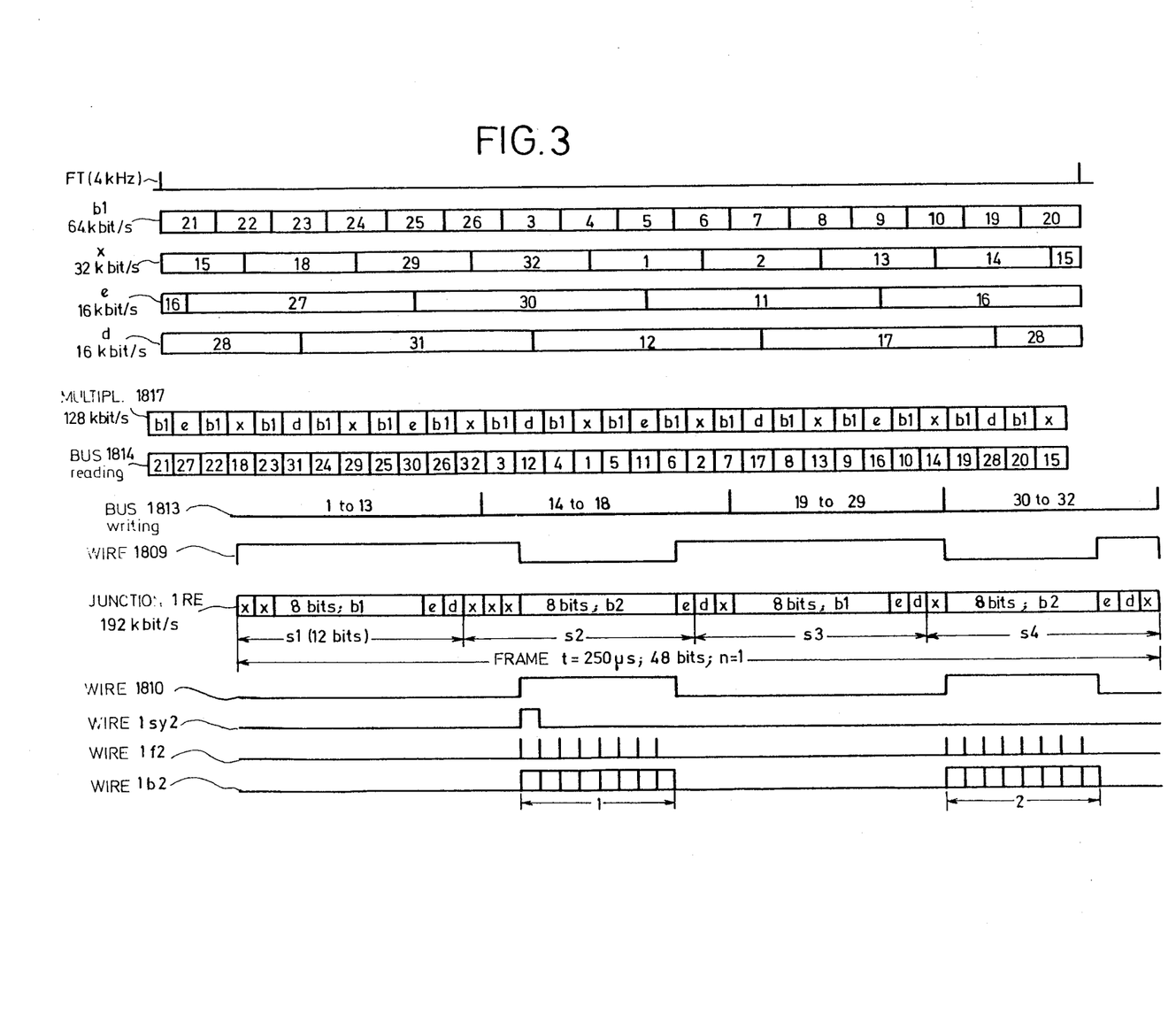
Figure 5:
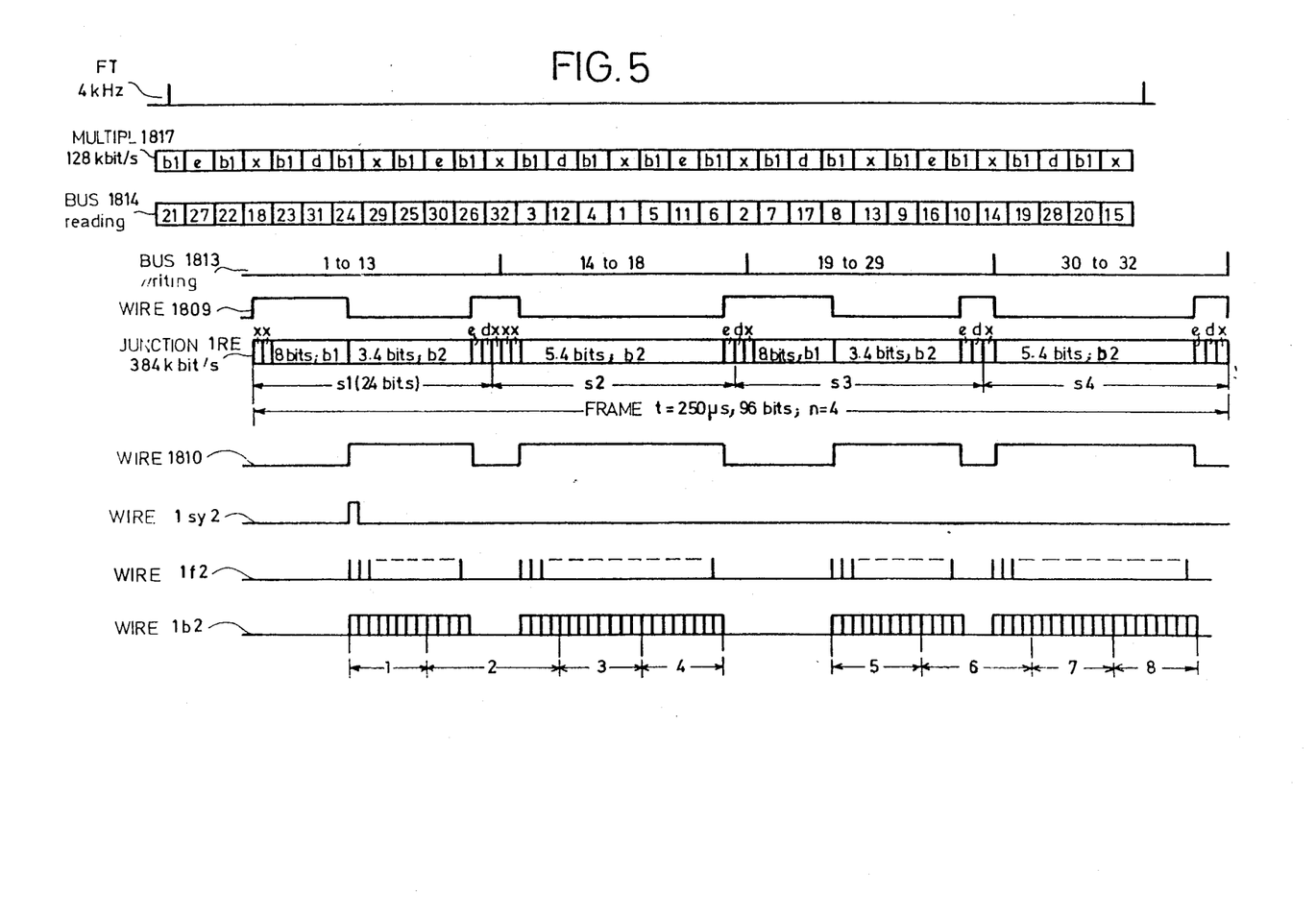

With reference to a tenth line of FIG. 3 and a sixth line of FIG. 5, a second frame t created in station 2 is similar to frame T, replacing the bits of channels B1, X, E, D and B2 by bits of channels b1, x, e, d and b2 respectively. Thus frame t is divided into four consecutive sectors $s_1$, $s_2$, $s_3$ and $s_4$, each having a duration of 62.5 $\mu$s and each containing at least 12 bits. The distribution of the channels in sectors $s_1$ to $s_4$ is also constant. The first sector $s_1$ always comprises one byte of channel b1 following two bits of channel x and ends with one bit of channel e followed by one bit of channel d. The second sector $s_2$ always comprises one byte of channel b2 following three consecutive bits of channel x and ends with one bit of channel e. The third sector $s_3$ always comprises one byte of channel b1 following one bit of channel d and one bit of channel x and ends with one bit of channel e followed by one bit of channel d. The fourth sector $s_4$ always comprises at least one byte of channel b2 following one bit of channel x and ends with one bit of channel e, one bit of channel d and one bit of channel x.

Frames T and t as defined above and shown in FIGS. 2 and 3 correspond to a link with a basic rate of 192 kbit/s and $N=n=1$, for example for a low-rate terminal or any terminal awaiting establishment of a communication.

In other conditions, further to the establishment of incoming or outgoing communications, the rate of channel B2 in junctions 1EM and 2RE can be modified to a higher rate (N.64) kbit/s and frame T then contains (N.16) bits of channel B2, and/or the rate of channel b2 in junctions 2EM and 1RE can be modified to a higher rate (n.64) kbit/s and frame t then contains (n.16) bits of channel b2. FIGS. 4 and 5 show examples of frames T and t with N=n=4. In this case, each sector of frame T, t contains in addition of $(N-1)16/4=(n-1)16/4$ bits of channel B2, b2 in relation to the frames at the basic rate shown in FIGS. 2 and 3. Thus, with reference to FIGS. 4 and 5, the first sector $S_1$, $s_1$ contains $4(N-1)=4(n-1)=12$ consecutive bits of channel B2, b2 following the byte of channel B1, b1 in this sector; the second sector $S_2$, $s_2$ contains $8+12$ consecutive bits of channel B2, b2 following the corresponding first three bits of channel X, x in this sector; the third sector $S_3$, $s_3$ contains 12 consecutive bits of channel B2, b2 following the byte of channel B1, b1 in this sector; and the fourth sector $S_4$, $s_4$ contains $8+12$ consecutive bits of channel B2, b2 following the first bit of channel X, x in this sector.

With reference again to FIG. 1, the multiplexing and demultiplexing equipments connected to the transmission mediums 12 and 21 concerning stations 1 and 2 have substantially identical structures. Thus the equipments in station 1, 2 comprise, on the transmission side, a multirate programmable multiplexer 13, 23, a programmable time base 14, 24 and a transmitting circuit 15, 25, and on the reception side, a receiving circuit 16, 26, a programmable clock recovering circuit 17, 27 and a multirate programmable demultiplexer 18, 28. The programmable circuits are programmed under the control of a control unit 19, 29 also contained in the station 1, 2.

As the structure and operation of the multiplexing and demultiplexing equipments in the stations are practically identical, those contained in station 1 are described hereinafter with reference to FIGS. 1 and 6 to 9.

Control unit 19 receives demultiplexed channel d at the rate of 16 kbit/s through output path 1d of demultiplexer 18 and detects packets intended for it and transmitted by control unit 29 of the other station 2, thereby changing the rate on at least one of the transmission mediums 12 and 21. A rate change request may also be transmitted in packets of an input path 1D of multiplexer 13, carrying channel D at the initial rate of 16 kbit/s, following a rate change request from a local terminal served by station 1 or a remote terminal, via the switched network.

In order to change the rate in the corresponding multiplexing and demultiplexing equipments, control unit 19 writes new data in all the programmable circuits of these equipments. Control unit 19 transmits number N to time base 14, number n to clock recovering circuit 17, the format of frame T to be transmitted to multiplexer 13 and the format of frame t to be received to demultiplexer 18 via a bus 190.

It is to be noted that until either of stations 1 or 2 has acknowledged receipt of a rate change request from the other station 2 or 1, numbers N and n are not modified. For example, as soon as the terminal or station 2 is started up, the numbers N and n are equal to one and mediums 12 and 21 offer a modulation rate corresponding to the 192 kbit/s basic rate. After an initial rate change for which N is other than 1 and/or n is other than 1, a second rate change can return N and n to one, for example if the terminal is using time sharing, or directly give them values other than one and those preceding the second rate change. In any case, when the two stations return to standby, awaiting establishment of another communication, the channels carry no signals to the inputs of multiplexers 13 and 23.

Figure 6:
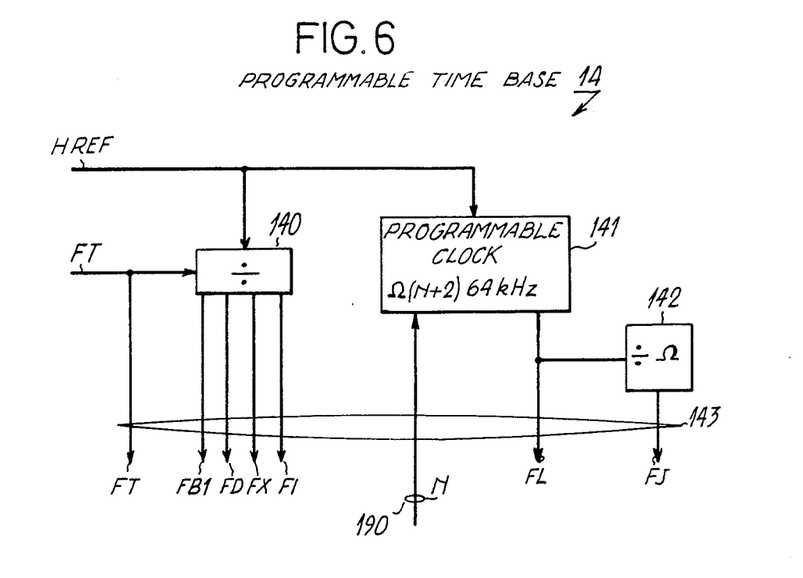
FIG. 6 is a block-diagram of a programmable time base in one of the stations.

With reference to FIG. 6, time base 14 chiefly contains two non-programmable frequency dividers 140 and 142 and a programmable frequency clock 141. Time base 14 receives from the monitoring system two clock signals for synchronization of all the transmission equipments, a clock signal FT for synchronizing the frame frequency to 4 kHz and a reference clock signal HREF at frequency k.64 kHz, where k is an integer. The non-programmable frequency divider 140 derives from the frame signal FT and the reference clock signal HREF, clock signals at initial frequency FB1 of channel B1 equal to 64 kHz, at initial frequency FD=16 kHz of channels D and E equal to the frequency of sectors $S_1$ to $S_4$, the initial frequency FX of channel X equal to 32 kHz and at an intermediate multiplexing frequency FI of the constant rate channels B1, D, E and X equal to 128 kHz. Clock 141 is programmable as a function of the number N in bus 190 and produces a clock signal at the variable frequency $FL=\Omega(N+2)64$ kHz equal to the modulation speed of the signal carried on medium 12. The non-programmable divider 142 divides the frequency of signal FL by $\Omega$ to produce variable rhythm frequency FJ of the signal resulting from multiplexing and carried in junction 1EM, equal to $((N+2).64)$ kHz. The above-mentioned seven clock signals are applied by an output bus 143 of time base 14 to clock inputs of multiplexer 13, demultiplexer 18 and transmitting circuit 15.

Figure 7:
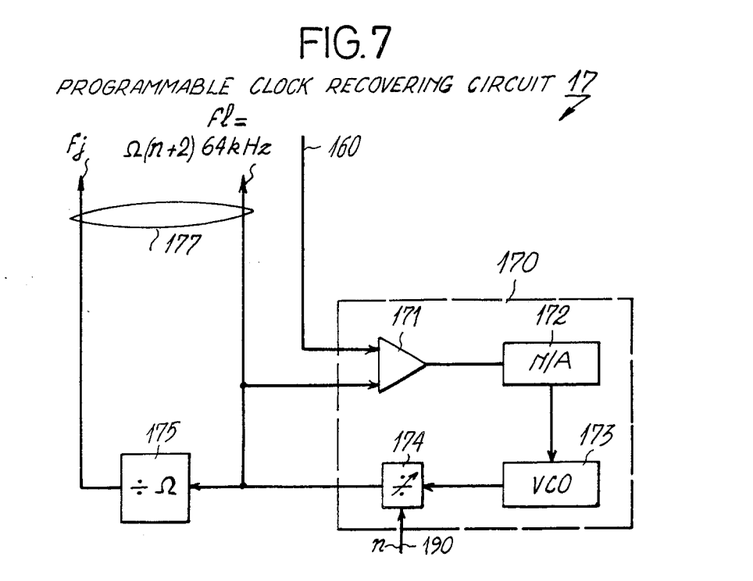
FIG. 7 is a block-diagram of a programmable clock recovering circuit in one of the stations.

With reference to FIG. 7, the clock recovering circuit 17 on the reception side essentially comprises a phase locking loop circuit 170 allowing recovery of rhythm frequency fl of the signal resulting from multiplexing in multiplexer 23, and carried in medium 21, equal to $\Omega(n+2)64$ kHz, and a non-programmable frequency divider 175. Circuit 170 conventionally comprises a phase comparator 171 receiving, through a first input 160, a rhythm signal produced by receiving circuit 16, a voltage control circuit 712, such as a digital-to-analog converter, and a voltage controlled oscillator 173. Between an output of the oscillator and a second input of the phase comparator, circuit 170 comprises a frequency divider 174 that is programmable by the control unit 19 according to the number n in bus 190 so that can be recovered a clock signal having frequency $fl=\Omega(n+2)64$ kHz and synchronous with time base 24 of the other station 2, at any change in the rate in transmission medium 21. Using rhythm frequency fl, non-programmable frequency divider 175 divides frequency fl by $\Omega$ and produces a clock signal fj at the variable rhythm frequency of the multiplexed signal carried in junction 1RE equal to $(n+2)$ 64 kHz. The clock signals fl and fj are applied by an output bus 177 of the clock recovering circuit 17 to clock inputs of receiving circuit 16 and demultiplexer 18.

It is to be noted that frames T and t in mediums 12 and 21 are phase shifted by a shift $\tau$ typically equal to 10.4 $\mu$s, whatever the modulation speed. The phase shift $\tau$ corresponds to a minimum guard time in station 2 between the reception end of a bit in channel D and the transmission beginning of a bit in channel d in order to meet the criteria concerning the solving of channel D access disputes.

Figure 8:
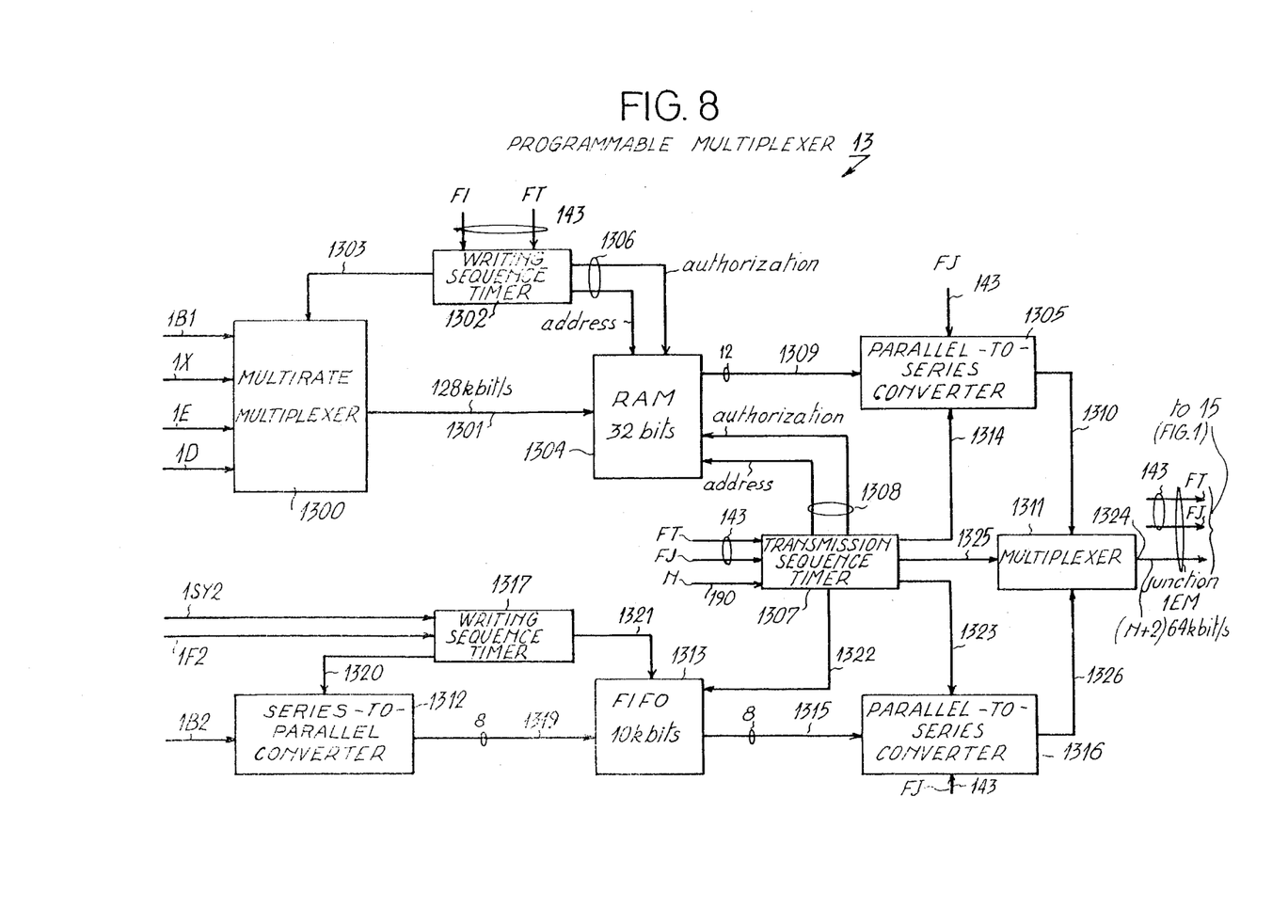
FIG. 8 is a block-diagram of a programmable multiplexer in one of the stations.

With reference to FIG. 8, programmable multiplexer 13 comprises means for multiplexing channels B1, X, E and D having constant initial rates, but which are all different, into a multiplex signal at the rate of FJ in which channels B1, X, E and D are already distributed according to the structure of frame T, and means separated from the multiplexing means for increasing the initial rate of channel B2 to the rate of FJ in the junction 1EM and for distributing the bits of channel B2 according to the structure of frame T.

The means for multiplexing channels B1, X, E and D comprises, at the input, a multirate multiplexer 1300 receiving channels B1 and X having initial rates of 64 kbit/s and 32 kbit/s, through input paths 1B1 and 1X, and channels D and E having initial rates of 16 kbit/s through input paths 1D and 1E. Multiplexer 1300 multiplexes channels B1, X, D and E bit-by-bit into an intermediate digital signal having a constant rhythm frequency $FI=(64+32+16+16)=128$ kHz in an intermediate path 1301. In path 1301, the intermediate signal consists of frames having a duration of 250 μs. Each frame of 250 μs comprises 16 bits of channel B1, 8 bits of channel X, 4 bits of channel E and 4 bits of channel D. In accordance with conventional principles, multiplexer 1300 is controlled by a writing sequence timer 1302, and selects one of input pathes 1B1, 1X, 1E and 1D in order to constitute recurrent frames of 250 μs having a structure such that the sequence of bits B1, D, B1, X, B1, E, B1, X is repeated four times. The timer 1302 included in multiplexer 13 takes clock signals FI and FT and produces an input selection control signal for multiplexer 1300 delivered by bus 1303 to multiplexer 1300.

32-bit groups of the intermediate multiplex signal in path 1301 are written at frame frequency FT in a buffer memory RAM 1304 with serial input and parallel output. The RAM memory has a capacity of 32 one-bit cells, equal to the number of bits of channels B1, X, E and D in one frame T, as shown in FIG. 2. Each bit of the multiplex signal at 128 kbit/s is written in a cell of memory 1304 having as its address the number of the bit location in frame T. Thus, with reference to FIG. 2, bits B1, D, B1, X, B1, E, B1, X; B1, D, B1, X, B1, E, B1, X ; etc. in the intermediate signal at the beginning of a frame T are written in the cells of memory 1304 having addresses 21, 12, 22, 18, 23, 11, 24, 29, 25, 17, 26, 32, 3, 16, 4, 1, etc., respectively. The addresses in the above order of writing are provided by timer 1304 to memory 1034 via an address and write authorization bus 1306.

The reading of bits in memory 1304 is controlled by a transmission sequence timer 1307 in order to transmit the bits of channels B1, X, E and D in the order indicated in frame T, at the rhythm frequency $FJ=(N+2)$ 64 kHz in junction 1EM. Depending on the clock signals FT and FJ delivered by time base 14, timer 1307 derives a regular read authorization signal as well as read addresses, via a read authorization and address bus 1308, as shown in an eight line of FIG. 2 or a fourth line of FIG. 4, and also derives a loading and enable pulse signal for a parallel-to-series converter 1305, having pulse widthes corresponding to the locations of the bits of channels B1, X, E and D in frame T, via wire 1314, as shown in a ninth line of FIG. 2 or a fifth line of FIG. 4. Thus, during frame T, address cells 1 to 10, then 11 to 15, 16 to 26, 27 to 29 and 30 to 32 in memory 1304 are read simultaneously and their contents are transmitted in parallel to the parallel-to-series converter 1305 via a bus 1309 in order to form the five fields in frame T occupied by the serial bits of the constant rate channels in an output wire 1310 of converter 1305, as shown in a tenth line of FIG. 2, or a sixth line of FIG. 4. The above-mentioned fields are separated by blanks or bit-free intervals intended to be occupied by the bits of channel B2. The bits of the constant rate channels thus distributed in frames T are transmitted in serial form by wire 1310 to a first input of output multiplexer 1311 controlled by the timer 1307 via a bus 1325.

In multiplexer 13, the means for increasing the initial rate of channel B2 and for distributing the bits of this channel in frames T comprises an input series-to-parallel converter 1312, a FIFO (First In, First Out) buffer memory 1313, an output parallel-to-series converter 1316, a writing sequencer timer 1317 and the transmission sequence timer 1307. The memory 1313 and the timer 1317 function in a way similar to that of memory 1304 and timer 1302 respectively.

In input path 1B2 of multiplexer 13, channel B2 offers a initial mean rate of N.64 kbit/s. According to a first embodiment, N.16 bits of channel B2 are regularly distributed in path 1B2 during a frame period T, in a way similar to the regular distribution of the bits of channel B1. According to a second embodiment, the N.16 bits of channel B2 are distributed in blocks of bits predetermined by the monitoring system in accordance with a predetermined distribution during a frame period; for example, this predetermined block distribution is initially phase shifted in relation to and identical to that of the two or four fields intended for occupation by the channel B2 bits in the frame to be constituted by multiplexer 13, as shown in a last line of FIG. 2 or 4. In any case, the monitoring system transmits a synchronisation signal at the frame frequency in phase with the first bit of channel B2 during a frame period, and a real bit rhythm frequency of channel B2 in input pathes 1SY2 and 1F2 to timer 1317. Converter 1312 converts received channel B2 into groups of 8 parallel bits carried over an eight-wire intermediate channel 1319 connected to inputs of FIFO memory 1313.

Memory 1313 has a capacity of $1250 \times 8 = 10000$ bits for memorization of all the bits of a B2 channel having the maximum rate of $(1250 \times 64)$ kbit/s = 80 Mbit/s during a frame half-period of 125 μs. Memory 1313 contains 1250 cells of 8 bits.

Depending on clock signals SY2 and F2, the writing sequence timer 1317 controls converter 1312 via a bus 1320 and establishes a write control signal applied to memory 1313 via bus 1321. As shown in a fourteenth line of FIG. 2 or a tenth line of FIG. 4, the write control signal authorizes writing of 8-bit groups in path 1319 in the FIFO memory whenever such an 8-bit group is received in path 1B2 at the mean frequency of 8N kHz.

The transmission sequence timer 1307 receives clock signals FT and FJ of time base 14 via bus 143 and the N encoded number from control unit 19, and uses these clock signals to derive a read signal preceding the transmission of any 8-bit group within the second four fields in frame T intended for occupation by the bits of channel B2, as shown in a thirteenth line of FIG. 2, or a ninth line of FIG. 4. The read signal is applied to memory 1313 via bus 1322. Thus, during a frame T of duration 250 μs, two cells are read in memory 1313 for insertion of 8 bits of channel B2 in sector $S_2$ followed by 8 bits of channel B2 in sector $S_4$ when N=1, as shown in FIG. 2. When N is other than 1, as shown in FIG. 4, 2N cells are read in memory 1313 for 250 μs for insertion of (N−1)4 bits, (N+1)4 bits, (N−1)4 bits and (N+1)4 bits of channel B2 in sectors $S_1$ to $S_4$ respectively. The read 8-bit groups of channel B2 are serialized in the parallel-toseries converter 1316 controlled by the transmission sequence timer 1307 via bus 1323. The converter 1316 thus transmits to a third input of multiplexer 1311 a digital signal in which blanks or bit-free intervals contain no data and are ready for occupation by the bits of channels B1, X, E and D delivered by output wire 1310 of converter 1305. All channels B1, B2, X, E and D according to the configuration of frame T are multiplexed in multiplexer 1311 into the resultant signal at the rate of (N+2)64 kbit/s in wire 1324 by means of multiplexing control signals supplied by timer 1307 via bus 1325. The resultant signal is transmitted in synchronism with the clock signal FT at 4 kHz and the clock signal FJ at (N+2)64 kHz in internal junction 1EM towards transmitting circuit 15.

Transmitting circuit 15 is conventional and for example comprises a transcoder for converting NRZ binary code into a line code, such as a CMI code, as well as a line adaptor. The line signal has a variable modulation rate $\Omega(N+2)64$ kbauds, where $\Omega$ depends on the line code. For the CMI code, $\Omega$ is equal to 2. Similarly, the receiving circuit 16 in this case comprises a CMI-binary NRZ transcoder delivering the digital signal with frame t resulting from multiplexing in station 2. Circuit 16 extracts the frame synchronisation signal ft from the line signal transmitted on the IRE link.

Figure 9:
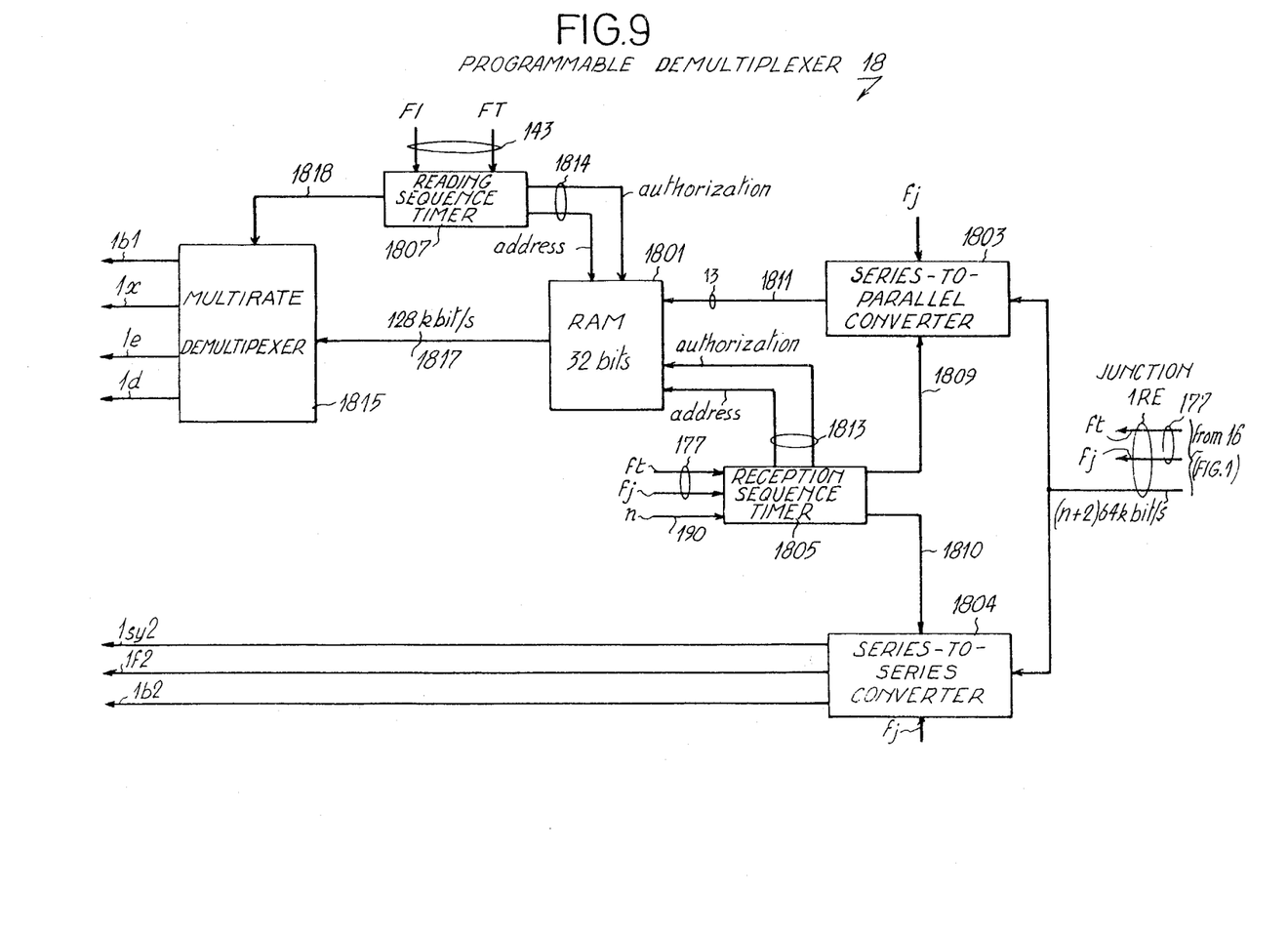
FIG. 9 is a block-diagram of a programmable demultiplexer in one of the stations.

The programmable demultiplexer 18 shown in detail in FIG. 9, carries out operations which are reciprocal to those performed in multiplexer 13 and demultiplexes five channels b1, b2, x, e and d.

Demultiplexer 18 essentially comprises a series-to-parallel converter 1803, a series-to-series converter 1804, a buffer memory 1801, a reception sequence timer 1805, a reading sequence timer 1807, and a multirate demultiplexer 1815 for returning to their initial format and shape constant rate channels b1, x, e and d on the one hand, and variable rate channel b2 on the other.

The reception sequence timer 1805 takes clock signal ft at frame frequency t and clock signal fj at the frequency of the received bits equal to (n+2)64 kHz transmitted by the receiving circuit 16 via internal junction IRE, and derives two pulse signals having pulses widthes falling either side of the first fields of successive bits of channels b1, x, e and d and the second fields of successive bits of channels b2 respectively, and delivered via wires 1809 and 1810 to converters 1803 and 1804, as shown in ninth and eleventh lines of FIG. 3, or fifth and seventh lines of FIG. 5. Timer 1805 thus separates the incoming digital signal at frame t and rate (n+2)64 kbit/s decoded in receiving circuit 16, into a digital signal only containing the bits of channels b1, x, e and d processed by the series-to-parallel converter 1803 and a digital signal containing only the bits of channel b2 processed by the series-to-series converter 1804.

The buffer memory 1801 is a RAM memory with parallel input and serial output, and has a capacity of 32 one-bit cells, equal to the constant number of bits of channels b1, x, e and d contained in one frame t. Write addresses for the cells of memory 1801 are established by the reception sequence timer 1805 and are delivered via an address and write authorization bus 1813 following the natural order 1 to 32 during a frame t, as shown in an eight line of FIG. 3 or a fourth line of FIG. 5. Thus, during a frame t, the bits to be memorized in address cells 1 to 13, then 14 to 18, 19 to 20 and 30 to 32 are received in converter 1803 and transmitted in parallel to memory 1801 via a bus 1811. However, read addresses of the cells of memory 1801 are delivered at intermediate frequency FI=128 kHz in an order different from the natural order 1 to 32 by reading sequence timer 1807 during a frame t, via an address and read authorization bus 1814, the timer 1807 receiving clock signals. FI and FT from time base 14 via bus 143. This order of the read addresses is determined by the distribution of the bits of channels b1, x, e and d in an intermediate multiplex signal having the rate of 64+32+16+16=128 kbit/s and transmitted from an output of memory 1801 to the multirate demultiplexer 1815 via an intermediate path 1817. The intermediate multiplex signal is shown in a sixth line of FIG. 3 or a second line of FIG. 5 and comprises a frame of T=250 $\mu$s consisting of 32 consecutive bits, having a sequence such that b1, e, b1, x, b1, d, b1, x is repeated four times. The preceding frame is obtained by reading the cells in memory 1801 in the order of the following successive addresses: 21, 27, 22, 18, 23, 31, 24, 29 . . . 28, 20, 15, as shown in a seventh line of FIG. 3 or a third line of FIG. 5, so that channels b1, x, e and d distributed according to the structure of frame t are multiplexed bit by bit in the intermediate channel 1817. Then in the multirate multiplexer 1815, under the control of appropriate clock signals produced by timer 1807 in bus 1818 and applied to four buffer memories included in the demultiplexer 1815, the intermediate signal at 128 kbit/s is demultiplexed into the four channels b1, x, e and d at initial rates of 64, 32, 16 and 16 kbit/s transmitted by output pathes 1b1, 1x, 1e, and 1d of circuit 18, as shown in second, third, fourth and fifth lines in FIG. 3.

With regard to the shaping of the variable rate channel b2, the bits of this channel extracted from frames t by the series-to-series converter 1804 are retransmitted in serial form to output path 1b2 of demultiplexer 18, accompanied by a clock signal marking the bits of channel b2 through a wire 1f2 and a synchronisation signal marking the first bit of channel b2 in a frame t through wire 1sy2, as shown in twelfth, thirteenth and fourteenth lines of FIG. 3, or eighth, ninth and tenth lines of FIG. 5. In FIGS. 3 and 5, as in FIGS. 2 and 4, it is assumed that channel b2 restored to the monitoring system contained a bit block distribution identical to that of the second four fields in a frame t.

It is to be noted that according to other embodiments of the invention, the write addresses in memory 1304 are delivered in the natural order 1 to 32 via bus 1306 and read addresses of memory 1304 are delivered according to the ordered locations of the bits of channels B1, X, E and D in frame T via bus 1308, i.e., in order 16, 20, 13, 15, 17, 19, 21, 23, 25, 27; 6, 2, 24, 28, 32; 14, 10, 4, 29, 31, 1, 3, 5, 7, 9, 11; 22, 18, 8; 30, 26, 12. Similarly, the read addresses of memory 1801 are delivered in natural order 1 to 32 via bus 1814, and the write addresses of memory 1801 are delivered according to the ordered locations of the bits of channels b1, x, E and d in frame t via bus 1813, i.e., in order 16, 20, 13, 15, 17, 19, 21, 23, 25, 27; 18, 14, 24, 28, 32; 26, 22, 4, 29, 31, 1, 3, 5, 7, 9, 11; 2, 30, 8; 10, 6, 12.

As already stated, the multiplexer 23 and the demultiplexer 28 in station 2 operate in a similar way to circuits 13 and 18, described in detail above, respectively. Indeed, the multiplexing operation in multiplexer 23 consists in multiplexing on the one hand channel b1 at 64 kbit/s, channel x at 32 kbit/s, channel e at 16 kbit/s and channel d at 16 kbit/s, received by input pathes 2b1, 2x, 2e and 2d, into a 128 kbit/s intermediate rate signal, and in multiplexing on the other this intermediate rate signal and channel b2 at (n.64) kbit/s, received by input path 2b2, into the resultant signal at (n+2)64 kbit/s and at frame t transmitted in internal junction 2EM between multiplexer 23 and transmitting circuit 25. This multiplexing operation is deduced from the multiplexing operation in multiplexer 13 indicated in FIG. 4, replacing N by n. Wires 2sy2 and 2f2 at the input to multiplexer 23 are added to path 2b2 to supply signal marking the first bit of channel b2 in a frame t and bits of channel b2, as in wires 1SY2 and 1F2. Similarly, the demultiplexing operation in multiplexer 28 consists in demultiplexing the digital signal at (N+2)64 kbit/s and frame T in internal junction 2RE between receiving circuit 26 and demultiplexer 28 into a 128 kbit/s intermediate signal containing the bits of channels B1, X, E and D and into channel B2 at (N.64) kbit/s delivered by an output path 2B2 on the one hand, and in demultiplexing the intermediate signal into channel B1 at 64 kbit/s, channel X at 32 kbit/s, channel E at 16 kbit/s and channel D at 16 kbit/s delivered by output pathes 2B1, 2X, 2E and 2D of demultiplexer 28 on the other. This demultiplexing operation is deduced from the demultiplexing operation in demultiplexer 18 indicated in FIG. 5, replacing n by N. As with demultiplexer 18, demultiplexer 28 supplies to the terminal, signals marking the first bit of restored channel B2 in a frame T and the bits of this channel B2 in output wires 2SY2 and 2F2.

As in station 1, control unit 29 in the station receives or transmits a rate change data of one or both channels B2 and b2 from pathes 2D and 2d.

The circuits in station 2 should be synchronised with station 1, in both reception and transmission. Unlike station 1, the clock signals HREF and FT are derived by receiving circuit 26 of station 2 and transmitted to programmable time base 24 in station 2 via a bus 261.

What we claim is:

1. A multiplexing equipment for multiplexing a first digital signal having a first constant rhythm frequency with a digital signal having a second variable rhythm frequency into a resultant digital signal having a variable rhythm frequency equal to the sum of said first and second rhythm frequencies and structured in recurrent frames having a predetermined period, said first digital signal carrying data indicating a change in the rhythm frequency of said second digital signal, said frame of said resultant signal comprising a constant number of bits of said first digital signal equal to the product of said first rhythm frequency by the frame period whatever said second variable rhythm frequency, and a variable number of bits of said second digital signal equal to the product of said second variable rhythm frequency by the frame period, said equipment comprising first means for memorizing consecutive bits of said first signal received during each frame period, first means for writing said received bits of said first signal in said first memorizing means at the rhythm of said first frequency, second means for memorizing the bits of said second signal received during no more than one frame period, second means for writing said received bits of said second signal in said second memorizing means at the rhythm of said second frequency, means for reading the written bits of said first signal at said rhythm frequency of the resultant signal and for reading said written bits of said second signal at said rhythm frequency of said resultant signal, means for transmitting and transcoding said resultant signal into a line signal, means for detecting said rhythm frequency change data, and means programmable as a function of said detected rhythm frequency change data for deriving at least a clock signal at said variable rhythm frequency of said resultant signal to be applied to said reading means, and a clock signal corresponding to a variable modulation speed of said line signal to be applied to said transmitting and transcoding means.

2. The multiplexing equipment claimed in claim 1 wherein said frame of said resultant signal is structured in a predetermined number of first fields and a predetermined number of a second fields.

said first fields being occupied by respective constant numbers of said first signal bits and distributed to predetermined locations in said frame, and having variable durations as a function of said variable rhythm frequency of said resultant signal, and said second fields being occupied by bits of said second signal, having respective durations which, vary as a function of said rhythm frequency of said resultant signal, and distributed to locations between said locations of said first fields.

3. The multiplexing equipment claimed in claim 2 wherein said bits of said first signal are distributed in said frame of said resultant signal is a predetermined order different from that in which the bits in the received first signal appear, and wherein said first writing means and said reading means respectively write and read address said first memorizing means using integers naturally ordered and according to said predetermined order, or vice-versa.

4. The multiplexing equipment claimed in claim 1 wherein said first memorizing means includes a random access memory having a capacity at least equal to said constant number of bits of said first signal in said frame.

5. A multiplexing equipment as claimed in claim 1 comprising means receiving digital signals having constant rates all different from each other and controlled by said first writing means for bit-by-bit multiplexing said different constant rate signals into said first digital signal.

6. The multiplexing equipment claimed in claim 5 wherein one of said digital signals having different constant rates carries said rhythm frequency change data in the form of said variable number of bits of said second digital signal in said frame, and is applied to said detecting means.

7. The multiplexing equipment claimed in claim 1 wherein said second memorizing means memorizes bits of the second signal during a frame half-period, is of the FIFO type, and has a capacity at least equal to a variable predetermined maximum number of bits of said second signal in said frame half-period.

8. A multiplexing equipment as claimed in claim 1 comprising means for bit-by-bit multiplexing four digital signals into said first digital signal, said four digital signals having respective rhythm frequencies of 64, 32, 16 and 16 kHz, and said rhythm frequency of said second digital signal being equal to N.64 kHz, where N is a variable integer lying between 1 and a predetermined maximum value and is included in said rhythm frequency change data.

9. A demultiplexing equipment for demultiplexing a resultant digital signal having a variable rhythm frequency and structured in recurrent frames having a predetermined period into a first digital signal having a first constant rhythm frequency and a second digital signal having a second variable rhythm frequency, said first digital signal carrying data indicating a change in the rhythm frequency of said second digital signal, said frame of said resultant signal comprising a constant number of bits of said first digital signal equal to the product of said first rhythm frequency by said frame period whatever said second variable rhythm frequency, and a variable number of bits of said second digital signal equal to the product of said second variable rhythm frequency by said frame period, said variable rhythm frequency of said resultant signal being equal to the sum of said first and second rhythm frequencies, said equipment comprising means for receiving and transcoding a line signal into said resultant signal, means for memorizing received first signal bits included in said resultant signal for said frame period, means for writing said received first signal bits in said first memorizing means at said frequency rhythm of said resultant signal, means for reading the written bits of said first signal at said first frequency, means for extracting received second signal bits included in said resultant signal and retransmitting them at said second rhythm frequency, means for detecting said rhythm frequency change data, and means programmable as a function of said detected rhythm frequency change data for deriving at least a clock signal at said variable rhythm frequency of said resultant signal to be applied to said writing means and to said extracting means, and a clock signal corresponding to a variable modulation speed of said line signal to be applied to said receiving and transcoding means.

10. The demultiplexing equipment claimed in claim 9 wherein said frame of said resultant signal is structured in a predetermined number of first fields and a predetermined number of second fields, said first fields being occupied by respective constant numbers of first signal bits and distributed to predetermined locations in said frame, and having durations as a function of said variable rhythm frequency of said resultant signal, and said second fields being occupied by bits of said second signal, having respective durations which vary as a function of said rhythm frequency of said resultant signal, and distributed at locations between said locations of said first fields.

11. The demultiplexing equipment claimed in claim 10 wherein said bits of said first signal are distributed in said frame of said resultant signal in a predetermined order different from that in which the bits in the resulting signal first signal are received, and wherein said writing means and said first reading means respectively write and read address the memorizing means using integers naturally ordered and according to said predetermined order, or vice-versa.

12. The demultiplexing equipment claimed in claim 9 wherein said memorizing means includes a random access memory having a capacity at least equal to said constant number of bits of said first signal in said frame.

13. A demultiplexing equipment claimed in claim 9 comprising means controlled by said reading means and receiving said read first digital signal for bit-by-bit demultiplexing digital signals having constant and differing rates.

14. The demultiplexing equipment claimed in claim 13 wherein one of the digital signals having differing constant rates carries said rhythm frequency rate change data in the form of said variable number of bits of said second digital signal in said frame and is applied to said detecting means.

15. The demultiplexing equipment claimed in claim 9 wherein said extracting means comprises a series-to-series converter receiving said resultant signal and retransmitting said second signal.

16. The demultiplexing equipment claimed in claim 9 wherein said clock signal deriving means comprises a phase lock loop circuit including a frequency divider programmable according to said detected rhythm frequency change data.

17. A demultiplexing equipment as claimed in claim 9 comprising means for bit-by-bit demultiplexing said first digital signal into four digital signals having respective rhythm frequencies of 64, 48, 16 and 16 kHz, said rhythm frequency of said second digital signal being equal to n.64 kHz, where n is a variable integer lying between 1 and a predetermined maximum value and is included in said rhythm frequency change data.

* * * * *